US007480560B2

(12) United States Patent
Boll

(10) Patent No.: US 7,480,560 B2
(45) Date of Patent: Jan. 20, 2009

(54) SELF-MEASURING AUTOMOTIVE TRAFFIC

(75) Inventor: David P Boll, Grosse Pointe Park, MI (US)

(73) Assignee: Microsoft Corporation, Redmond, WA (US)

( * ) Notice: Subject to any disclaimer, the term of this patent is extended or adjusted under 35 U.S.C. 154(b) by 737 days.

(21) Appl. No.: 10/846,305

(22) Filed: May 14, 2004

(65) Prior Publication Data

US 2005/0256634 A1 Nov. 17, 2005

(51) Int. Cl.
*G06F 19/00* (2006.01)

(52) U.S. Cl. ........................................ 701/117

(58) Field of Classification Search ......... 701/117–119, 701/209, 210, 213–215, 200; 455/456.1, 455/456.3, 456.5, 456.6, 457; 340/933, 934, 340/955.13, 955.21, 988, 995.13, 995.19; 342/357.06, 357.12
See application file for complete search history.

(56) References Cited

U.S. PATENT DOCUMENTS

| | | | | |
|---|---|---|---|---|
| 6,150,961 | A * | 11/2000 | Alewine et al. | 340/995.1 |
| 6,401,027 | B1 * | 6/2002 | Xu et al. | 701/117 |
| 6,480,783 | B1 * | 11/2002 | Myr | 701/117 |
| 6,594,576 | B2 * | 7/2003 | Fan et al. | 701/117 |
| 6,615,130 | B2 * | 9/2003 | Myr | 701/117 |
| 7,203,598 | B1 * | 4/2007 | Whitsell | 701/210 |
| 2003/0096621 | A1 * | 5/2003 | Jana et al. | 455/456 |

* cited by examiner

*Primary Examiner*—Yonel Beaulieu
(74) *Attorney, Agent, or Firm*—Merchant & Gould P.C.

(57) ABSTRACT

A method and apparatus for providing traffic density and flow information obtained from wireless devices. The wireless devices may be wireless telephones having Global Positioning System (GPS) capabilities. A server interacts with the wireless telephones wireless telephones to compile the traffic density and flow information. The traffic density and flow information is then available for dissemination to requesting wireless telephones, or other requesting clients capable of contacting the server.

13 Claims, 3 Drawing Sheets

SELF-MEASURING AUTOMOTIVE TRAFFIC

FIELD OF THE INVENTION

The present invention generally relates to vehicular traffic control systems. More specifically, the present invention generally relates to a vehicular traffic information gathering arrangement that uses wireless devices as information gathering sensors.

BACKGROUND OF THE INVENTION

In the following, a brief discussion of conventional components of current traffic control systems is provided.

Traffic signal controllers are used extensively through the United States and elsewhere around the globe. Most controllers are computer activated and use sophisticated software models to achieve optimization of traffic flow.

Years ago, digital computers began to be increasingly utilized in traffic control systems. Computers allowed creation of actuated controllers that have the ability to assist controlling traffic, in real-time, in response to actual traffic flow.

Generally, current controller operation can be divided into three primary categories: pre-timed, actuated (including both semi-actuated and fully actuated), and traffic response controller. Under the pre-timed operation, a master controller sets traffic signal phases and cycle lengths at predetermined rates based on historical data, whereas actuated controllers operate based on traffic demands as registered by the actuation of vehicle and/or pedestrian detectors.

Semi-actuated controllers maintain green lights (associated with traffic signals) on major streets, except when vehicles are detected on minor streets. If a vehicle is not detected, then the right of way associated with a major street is maintained. Fully-actuated controllers rely on detectors for measuring traffic flow on all approaches associated with an intersection and make assignments to the right of way in accordance with traffic demands.

The use of traffic response controllers has been gaining momentum in the recent years. Traffic response controllers are used, in conjunction with supplied traffic information, to control traffic flow. Therefore, it is important to ensure that information related to traffic can be collected in an efficient and cost-effective manner.

There are various methods in which traffic condition information may be collected in order to aid in optimizing traffic flow, through the use of traffic response controllers. For example, road sensor devices such as induction loops, traffic detectors and TV cameras mounted on poles may be used to monitor traffic conditions. Another way of supplying traffic condition information includes the use of mobile traffic units such as police, road service, helicopters and weather reports that may be provided by various information providing sectors. Finally, more recently, vehicle integrated mobile positioning and communication systems using GPS devices or similar vehicle-tracking/locating equipment are used to supply traffic related information to systems utilized to control and optimize traffic flow.

Although useful, the current traffic data collection methods and systems have various disadvantages. For example, there is a relatively high cost of capital investment needed to install fixed road devices, especially in existing road infrastructures, for monitoring traffic flow, and a potentially significant delay between when such infrastructure is planned for and when it is finally deployed, risking physically misplaced/misallocated infrastructure investment. In addition, there are a limited number of organizations, such as trucking, delivery and other service companies, utilizing GPS reporting systems. Moreover, there is a hurdle of establishing agreements to utilize information collected by such organizations. Finally, there are very few GPS or similar equipped vehicle-tracking/locating entities in service today. Therefore, the information provided by these few individual vehicles that include equipment for procuring and disseminating position information is insufficiently widespread and dense to allow conventional vehicular traffic control systems to make intelligent decisions related to traffic flow.

SUMMARY OF THE INVENTION

The exemplary embodiments of the present invention provide a method and arrangement where wireless devices currently in operation, or soon to be widely used via the emerging wireless mobile computing market, may be used as sensors for obtaining and disseminating traffic density and flow information. In particular, if a wireless device has (location awareness/GPS information receiving) capability, this information may be collected and used to supply traffic density and flow information back to wireless devices in order to assist users while driving.

An exemplary method formed in accordance with the present invention includes acquiring data from a plurality of wireless devices, and utilizing the acquired data from the plurality of wireless devices to compile traffic density and flow information pertaining to a geographical area where the plurality of wireless devices are located.

An exemplary apparatus formed in accordance with the present invention includes a server for acquiring data from a plurality of wireless devices, the server utilizing the acquired data from the plurality of wireless devices to compile at least one of traffic density and flow information pertaining to a geographical area where the plurality of wireless devices are located.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Brief Summary

In the following, an exemplary operating device and system will be described. Then, an exemplary graphical representation of traffic conditions will be discussed. Following the discussion of the exemplary operating device and system and the graphical representation of traffic conditions, an exemplary method according to the present invention will be described in conjunction therewith. Finally, alternatives will be covered. It is to be understood that the following description is merely illustrative and not limiting of claims of the present invention.

Exemplary Operating Device and System

Figure 1:
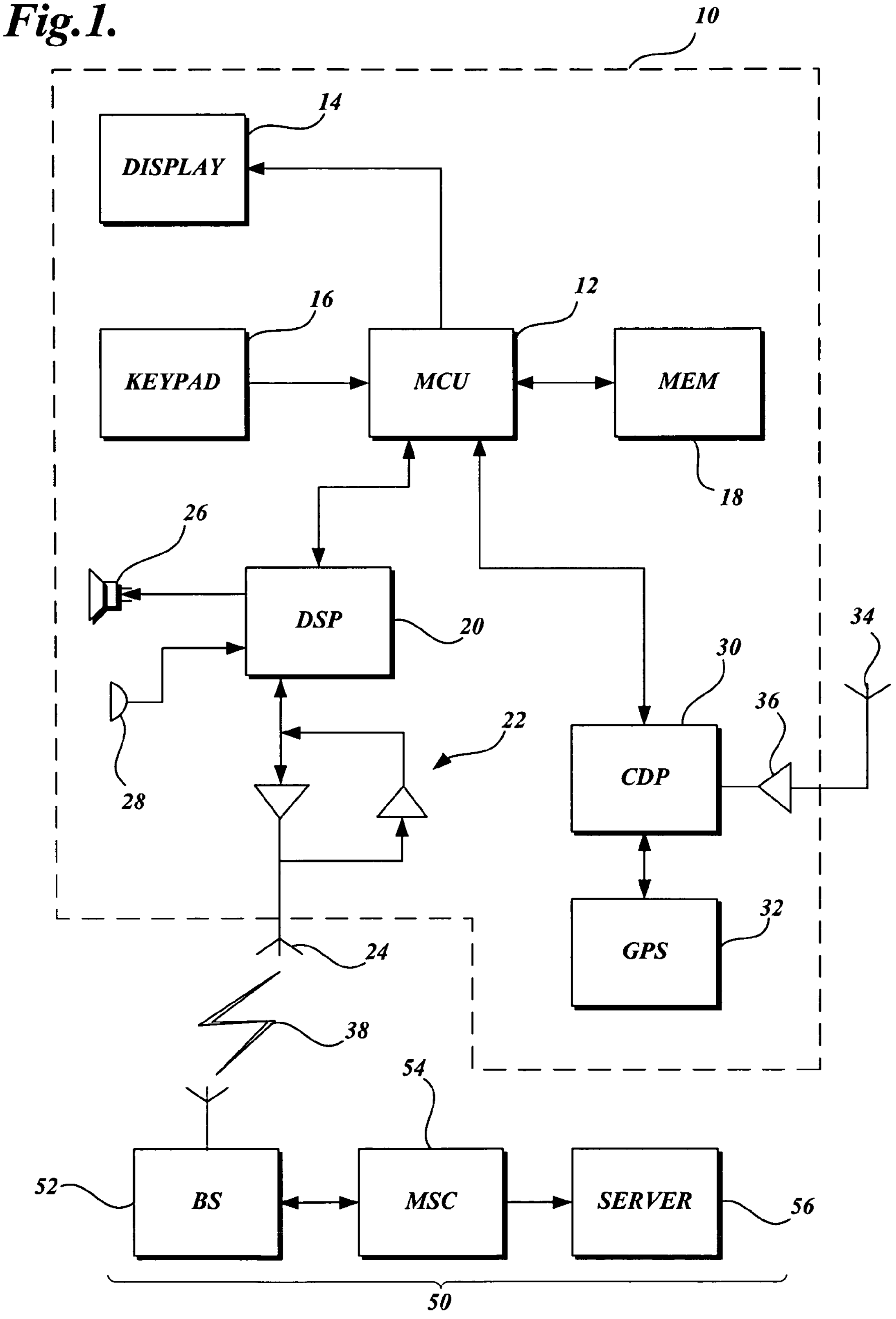
FIG. 1 illustrates an exemplary wireless device coupled to an exemplary wireless service provider.

FIG. 1 illustrates an exemplary wireless device 10 coupled wirelessly to an exemplary wireless service provider 50. As is illustrated, the wireless device 10 includes a data processor such as a Microprocessor Control Unit (MCU) 12 that is coupled to a visual display 14, such as an LCD. The MCU 12 receives input from a keypad 16. The keypad 16 may include alphanumeric keys, soft keys, a power ON/OFF key, etc., as is conventional in these types of devices. The combination of the MCU 12, the display 14 and the keypad 16 may be generally considered as a User Interface (UI) for the wireless device 10.

The wireless device 10 also includes a memory (MEM) 18 that stores an operating program for the MCU 12. In addition, the MEM 18 may also store user entered data and other data constants. Moreover, the MEM 18 also stores program instructions that implement the exemplary embodiments of the present invention.

A Digital Signal Processor (DSP) 20 of the wireless device 10 includes known baseband and audio functions related to the wireless device 10. A Radio Frequency (RF) transceiver is bi-directionally coupled to the DSP 20, as is also at least one antenna 24. In addition, a speaker 26 and a microphone 28 are also coupled to the DSP 20. The speaker 26 and microphone 28 enable the user to make and receive telephone calls via the wireless device 10.

As is further illustrated in FIG. 1, the wireless device 10 includes a controlling data processor (CDP) along with a Global Positioning System (GPS) accessory 32. The CDP 30 and the GPS accessory 32 are coupled to the MCU 12. A GPS antenna 34 and a receiver 36 are coupled to the CDP 30.

The GPS accessory 32 may include an integrated memory device and any required support circuitry for supporting an operating program and data. Such data may include satellite orbital parameters needed for acquiring transmissions from satellites associated with the GPS constellation (not shown). Transmissions from the GPS constellation are received by way of the GPS antenna 34.

During operation of the wireless device 10, a wireless transmission may be established between the wireless device 10 and the wireless service provider 50. As is illustrated, the wireless service provider includes a Base Station (BS) 52 coupled to a Mobile Switching Center (MSC) 54. The manner in which the BS 52 and the MSC 54 operate in conjunction with the wireless device 10 is well-known to those of ordinary skill in the art and therefore will not be described in detail herein. The wireless service provider 50 may also include the use of a server 56, which is coupled to the MSC 54. The operational characteristics of the server 56 in conjunction with the exemplary embodiments of the present invention will be described in further detail in the following.

In accordance with the exemplary embodiments of the present invention, the MCU 12 is responsive to position data (e.g., latitude, longitude, velocity and possibly elevation) received from the CDP 30 via the receiver 36 and the GPS antenna 34. The received position data may be communicated to the wireless service provider 50 via the antenna 24. The position data may be transmitted using a wireless control channel, such as a Digital Control Channel (DCCH) associated with the wireless transmission 38. However, other wireless control channels may also be used. For example, position data may also be transmitted using analog control channels, analog voice channels, etc.

Exemplary Graphical Traffic Representation

Figure 2:
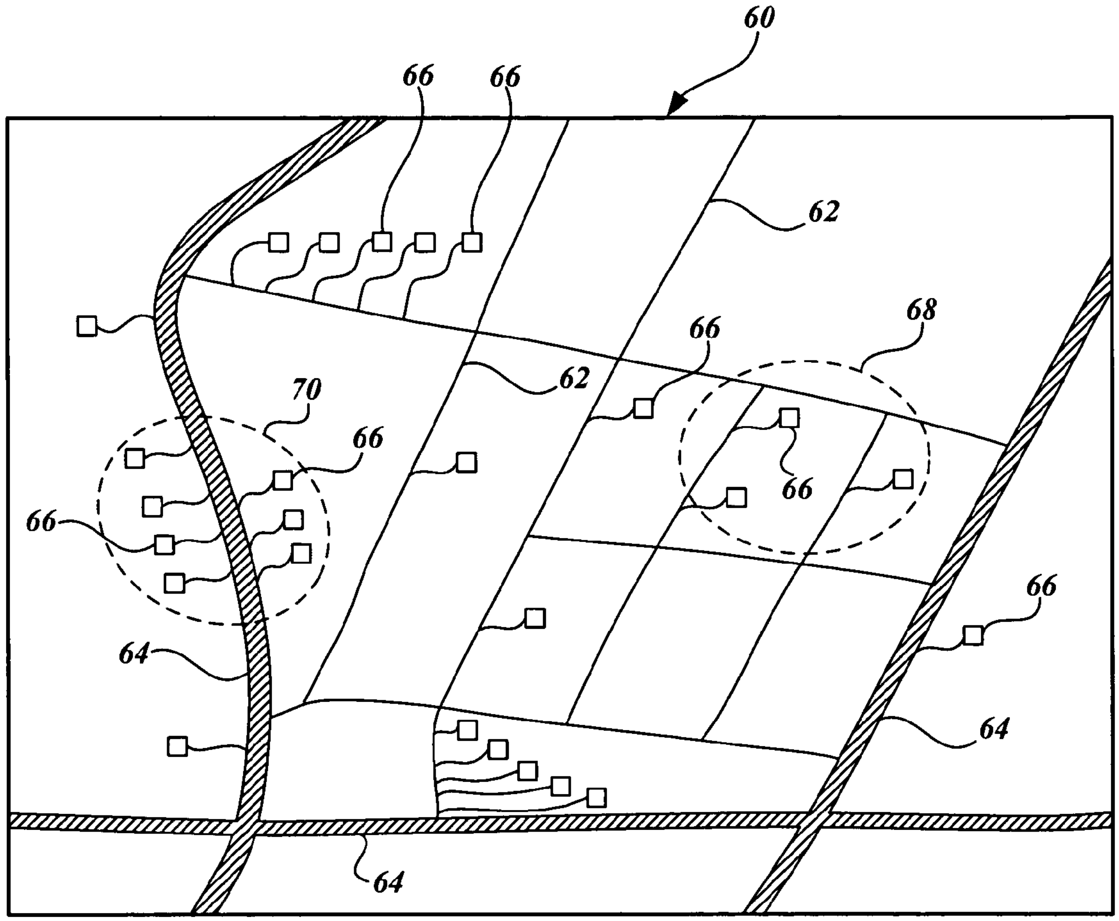
FIG. 2 illustrates a graphical map that includes various road arteries and larger highways.

FIG. 2 illustrates a graphical map 60 that includes various road arteries 62 and larger highways 64. Various vehicles 66 are also illustrated on the graphical map 60. Some of the vehicles 66 are traveling along road arteries 62 and/or highways 64 in a relatively disbursed manner. In particular, the various vehicles 66 that are traveling in a relatively disbursed manner are not clustered in a congested manner. The vehicles 66 that may be considered as traveling in a substantially disbursed manner are, for example, represented within the highlighted portion 68. In contrast, a highlighted portion 70 illustrates a group of vehicles 66 positioned in a generally congested manner.

Each of the vehicles 66 illustrated in the graphical map 60 may or may not include the use of a wireless device 10. The graphical map 60 will be discussed in further detail in relation to the flowchart illustrated in FIG. 3, and the wireless device 10 and the wireless service provider 50 illustrated in FIG. 1.

Exemplary Method

Figure 3:
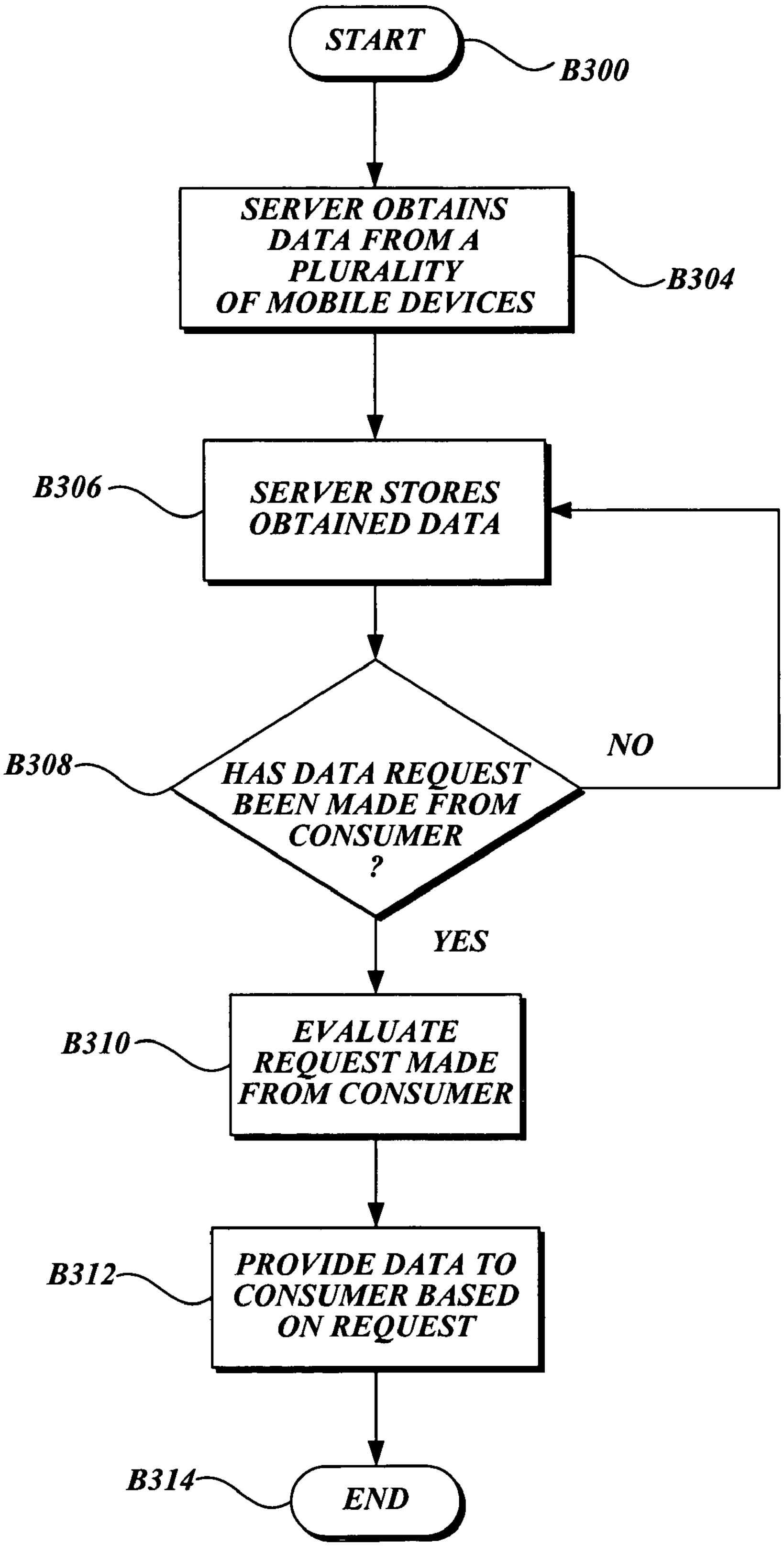
FIG. 3 is a flowchart illustrating a method of obtaining and disseminating data by way of a wireless service provider.

FIG. 3 is a flowchart illustrating a method of obtaining and disseminating data by way of wireless service provider 50. Block B300 represents the beginning of the illustrated method. Foremost, the server 56 obtains data from a plurality of wireless devices 10 positioned in the vehicles 66 (B304). The data obtained includes latitude in degrees, longitude in degrees, a velocity vector (compass heading in degrees and speed in statute miles-per-hour), a time stamp, and possibly identity information related to the respective wireless device 10 that the data was obtained from. Whether or not a wireless device 10 situated in one of the vehicles 66 includes the indicated data depends upon the configuration of the given wireless device 10. For example, a user of the wireless device 10, having the capability of receiving and disseminating position data, may choose to provide such data in order to in return receive information pertaining to traffic density and flow from the server 56. Therefore, according to an exemplary embodiment of the present invention, a wireless device 10 that provides position information may correspondingly receive location appropriate traffic data from the server 56 in response to the provided data.

After the server 56 receives the data from a plurality of the wireless devices 10, the server 56 stores the obtained data on a volatile and/or nonvolatile memory associated with the server 56 (B306). Therefore, in the case of the graphical map 60 illustrated in FIG. 2, if each of the vehicles 66 includes a wireless device 10, and these wireless devices 10 are in communication with the wireless server provider 50, then the server 56 will include the relatively large amount of position data that may be communicated to wireless devices 10 in need of traffic density and flow information.

Next, at any given time, a wireless device 10 positioned in a vehicle 66 may request data, in particular, traffic density and flow information, pertaining to various road arteries 62 and highways 64 located in the vicinity of a vehicle 66 carrying a wireless device 10 (B308). Based on the request in block B308, the server 56 evaluates the request made by the wireless device 10 (B310). Specifically, the server 56 will evaluate current position data associated with, and provided by, the requesting wireless device 10. Based on this current position data provided by the wireless device 10, the server 56 will transmit traffic density and flow information, via the MSC 54 and the BS 52 to the requesting wireless device 10 (B312). This traffic density and flow information may include information pertaining to possible congestion in current traffic conditions. For example, the data provided by the server 56 in block B312 may include information pertaining to the congestion illustrated in the highlighted portion 70 of FIG. 2. Therefore, if a vehicle were headed toward the vicinity of the highlighted portion 70, then an operator of the vehicle 66 would have the opportunity to modify and/or change the current course of the vehicle 66 operated by the user.

The data provided in block B312 may be represented in various ways based on the type of wireless device 10 being used in a vehicle 66. For example, the data provided may be in the form of voice communicated information, a graphical map generally represented as shown in FIG. 2, a simple dataset indicating the number and state of vehicles in the vicinity, and/or commands directing the user of the wireless device 10 to make alterations in a current travel direction in order to avoid any undesirable traffic condition. The specifics of how the data provided in block B312 are represented are not described in detail herein, as the manner in which such data may be represented is well within the purview of those having ordinary skill in the art.

Block B314 represents termination of the method illustrated by way of the flowchart of FIG. 3. However, it should be understood that the various blocks illustrated in FIG. 3 in association with the flowchart may be repeated as deemed necessary by the server 56, and as required by requests made by wireless devices 10 positioned within vehicles 66.

Alternatives

Although the wireless device 10 has been illustrated as including the GPS accessory 32 along with the associated CDP 30, the receiver 36 and the GPS antenna 34, it should be understood that the wireless device 10 may still provide position data to the wireless service provider 50 in a manner that does not require the indicated GPS circuitry. For example, in one exemplary embodiment, the wireless device 10 may calculate its position using information received from a plurality of base stations 52, or based on information received directly from only one base station 52.

Additionally, it is also possible for a wireless device 10 to simply supply GPS information obtained using the GPS accessory 32 along with the CDP 30, the receiver 36 and the GPS antenna 34. In this case, the position data may be calculated by a data processor that is external to the wireless device 10, such as a data processor associated with the wireless service provider 50. Moreover, the wireless service provider 50 may include location awareness technology that allows it to determine position information related to the wireless device 10 or devices without the use of GPS technology. Such location awareness technology is known to those of ordinary skill in the art.

The server 56 of the wireless service provider 50 may also provide traffic density and flow data related to information obtained from various wireless devices 10 to other entities other than the wireless devices 10. For example, the server 56 may be connected to various computers via a network connection (e.g. the server 56 may be a web-server), and requesting computers with proper authorization may obtain position related data from the server 56. This obtained position related data may then be communicated to other devices, and/or processed and used by the obtaining computer.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of compiling vehicular traffic flow information, the method comprising:

acquiring vehicular traffic data in the form of position information from a plurality of wireless telephones capable of receiving and disseminating position information and having Global Positioning System (GPS) capability, each of said plurality of wireless telephones being carried by a respective vehicle, the GPS capabilities of said wireless telephones being used to determine the position of the related wireless telephone and, thus, the position of the vehicle carrying the wireless telephone, wherein acquiring vehicular traffic data from the plurality of wireless telephones includes allowing users of the plurality of wireless telephones to choose to provide vehicular traffic data;

utilizing the acquired vehicular traffic data from the plurality of wireless telephones to determine velocity of movement data for the vehicles carrying the wireless telephones and utilizing the velocity of movement data to compile traffic flow information for the geographical area within which the vehicles carrying the plurality of wireless telephones are located; and disseminating the traffic flow information only to the users of the plurality of wireless telephones that provide the vehicular traffic data.

2. The method according to claim 1, wherein the acquired vehicular traffic data includes latitudinal and longitudinal position data.

3. The method according to claim 2, wherein the acquired vehicular traffic data also includes elevational data.

4. The method according to claim 1, wherein the disseminated information is in the form of one of a graphical representation including detailed traffic flow information, a dataset indicating the number and state of vehicles in a vicinity, voice communicated traffic flow information, and commands detailing routing information.

5. The method according to claim 1, wherein disseminating the information includes transmitting the information via a Digital Control Channel.

6. The method according to claim 1, wherein disseminating the information includes transmitting the information via an Analog Control Channel.

7. A system for compiling vehicular traffic flow information, the system comprising:

a plurality of wireless telephones each having Global Positioning System (GPS) capability, each of said plurality of wireless telephones being carried by a respective vehicle, the GPS capabilities of said wireless telephones used to determine and transmit a position of a related wireless telephone and, thus, a position of the vehicle carrying the wireless telephones; and a server configured to:

receive position transmissions from each of the plurality of wireless telephones whose users choose to provide the position transmissions, utilize the received position transmissions from the plurality of wireless devices to compile traffic flow information pertaining to a geographical are where vehicles carrying the plurality of wireless devices are located, and disseminate the traffic flow information only to the users of the plurality of wireless telephones that provide the position transmissions.

8. The system according to claim 7, wherein the server is coupled to a wireless service provider that receives the position transmission from the plurality of wireless telephones and forwards the received position transmissions to the server.

9. The system according to claim 8, wherein the wireless service provider includes at least one Base Station (BS) and a Mobile Switching Center (MSC).

10. The system according to claim 7, wherein the server provides the compiled traffic flow information to at least one wireless telephone requesting such information.

11. The system according to claim 7, wherein the server is a web-server capable of being accessed via the Internet.

12. The method of claim 1, wherein the undesirable traffic condition includes traffic congestion, and disseminating the traffic flow information includes highlighting a portion of the traffic flow information indicating the traffic congestion.

13. A system for compiling vehicular traffic flow information, the system comprising:

a server configured to:

receive global positioning information from a plurality of wireless telephones whose users choose to provide global positioning information;

utilize the global positioning information to calculate position data for the plurality of wireless devices;

utilize the position data to compile traffic flow information pertaining to a geographical area where vehicles carrying the plurality of wireless devices are located; and disseminate the traffic flow information only to the users of the plurality of wireless telephones that provide the global positioning information, wherein disseminating the traffic flow information includes disseminating commands directing the users to make alterations in a current travel direction to avoid an undesirable traffic condition.

* * * * *